US006248826B1

(12) United States Patent
Solomon et al.

(10) Patent No.: US 6,248,826 B1
(45) Date of Patent: Jun. 19, 2001

(54) EMULSION COPOLYMERS FROM TERMINALLY UNSATURATED ACRYLIC ACID OLIGOMERS

(75) Inventors: Robert David Solomon, Souderton; Gary David Greenblatt, Rydal, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/357,176

(22) Filed: Jul. 16, 1999

Related U.S. Application Data
(60) Provisional application No. 60/093,995, filed on Jul. 24, 1998.

(51) Int. Cl.[7] .............................. C08F 2/26; C08F 222/02; C08L 35/00; C08L 51/00
(52) U.S. Cl. .................. 524/556; 524/600; 524/832; 526/318.2; 526/318.3; 526/318.4; 526/318.44
(58) Field of Search ................................ 524/458, 556, 524/832, 600; 526/318.2, 318.3, 318.4, 318.44

(56) References Cited

U.S. PATENT DOCUMENTS

| | | |
|---|---|---|
| 4,056,559 | 11/1977 | Lewis et al. . |
| 4,193,902 | 3/1980 | Mondt et al. . |
| 4,539,361 | 9/1985 | Siol et al. . |
| 4,680,352 | 7/1987 | Janowicz et al. . |
| 4,694,054 | 9/1987 | Janowicz . |
| 5,141,814 | 8/1992 | Anderson et al. . |
| 5,356,968 | 10/1994 | Rupaner et al. . |
| 5,587,431 | 12/1996 | Gridnev et al. . |
| 5,624,992 | 4/1997 | Aydin et al. . |
| 5,710,227 * | 1/1998 | Freeman et al. ...................... 526/208 |
| 5,910,531 | 6/1999 | Freeman et al. . |
| 5,936,026 * | 8/1999 | Huybrechts et al. ................ 524/504 |

FOREIGN PATENT DOCUMENTS

| | | |
|---|---|---|
| 4026640 | 8/1990 | (DE) . |
| 466409 | 1/1992 | (EP) . |
| 612805 | 8/1994 | (EP) . |
| 650946 | 5/1995 | (EP) . |
| 0687690 | 12/1995 | (EP) . |
| 694564 | 1/1996 | (EP) . |
| 741173 | 11/1996 | (EP) . |
| 0779305 | 6/1997 | (EP) . |
| WO 95/32228 | 11/1995 | (WO) . |
| WO 95/32255 | 11/1995 | (WO) . |
| WO 9532228 * | 11/1995 | (WO) ................................... 524/504 |
| WO 9532255 * | 11/1995 | (WO) ................................... 524/504 |

OTHER PUBLICATIONS

Wu X Keven et al: "Acrylic binders for dry pressing ceramics" Ceramic Engineering and Science Proceedings, vol. 18, No. 2 1997, pp. 422–438, XP002123184.

* cited by examiner

*Primary Examiner*—David W. Wu
*Assistant Examiner*—Kelechi C. Egwim

(57) ABSTRACT

An aqueous dispersion of a copolymer formed by the emulsion polymerization of a monomer mixture including from 0.1 to 20% by weight of one or more terminally unsaturated carboxylic acid oligomers; from 80 to 99.9% by weight of at least two monomers selected from esters and amides of (meth)acrylic acid, vinyl esters of carboxylic acids, vinyl aromatic compounds, ethylenically unsaturated nitrites, vinyl halides, and non-aromatic hydrocarbons; and 0 to 10% by weight of other copolymerisable monomers is provided. The aqueous copolymer dispersion is polymerized in the presence of anionic surfactant and at an acid pH. Also provided is a method of preparing the aqueous copolymer dispersion. Aqueous copolymer dispersions including the terminally unsaturated carboxylic acid oligomers have low viscosities over a broad pH range and are useful in coating compositions, as binders for nonwovens, textiles, paper coatings, and as adhesives.

12 Claims, No Drawings

EMULSION COPOLYMERS FROM TERMINALLY UNSATURATED ACRYLIC ACID OLIGOMERS

This is a nonprovisional application of prior pending U.S. provisional application Ser. No. 60/093,995 filed Jul. 24, 1998.

This invention is concerned with polymer dispersions. More particularly, the present invention concerns polymer dispersions which are capable of demonstrating low viscosities over a broad pH range.

Aqueous dispersions of carboxylic acid containing polymers are known to have many applications, including use as binders in coating compositions. Typically, these polymer dispersions are formed from the emulsion polymerization of a mixture of ethylenically unsaturated monomers comprising up to 20% by weight of a carboxylic acid containing monomer, such as acrylic acid (AA) or methacrylic acid (MAA). Such polymer dispersions demonstrate relatively low viscosities at low pH levels, e.g. pH 3–5, but tend to demonstrate significantly higher viscosity's at higher pH levels, e.g. pH 8 to 10. Polymer dispersions with low viscosities can be formulated to comprise higher polymer solids, e.g. 50% by weight polymer solids, whereas in comparison dispersions with high viscosity's can only be formulated to comprise lower polymer solids, e.g. 40% by weight polymer solids. Accordingly, to minimize transport costs, the polymer manufacturer would prefer to supply customers with low pH, high polymer solids dispersions.

Since coating compositions, such as paints, are usually formulated at a pH in the range 8 to 10, and since the polymer manufacturer likes to supply the coatings manufacturer with a ready-to-use dispersion, the polymer dispersion is preferably supplied at an appropriately high pH. However, formulating high solids polymer dispersions into paints at high pH can result in coagulation or gellation of the formulation. Consequently, the carboxylic acid containing polymer dispersions which are traditionally supplied at the high pH either have a relatively lower solids content and/or comprise a significant quantity of anionic surfactant. This means that not only are the polymer manufacturer's transport costs higher, as he has to transport relatively more water in the dispersion, but also the coating compositions have to contain relatively higher quantities of water and/or surfactant.

These problems are particularly acute where it is desired to manufacture high solids polymer dispersions where the particle size of the polymer is required to be very small, e.g. 100 nm or less. These dispersions tend to be highly viscous at high pHs, and consequently require very high levels of anionic surfactants to enable their manufacture even at relatively low polymer solids.

A process for the preparation of finely particulate plastics dispersions from a monomer mixture comprising various ethylenically unsaturated monomers, including 0.1 to 5% by weight of an α,β-unsaturated monocarboxylic acid is disclosed in U.S. Pat. No. 4,193,902. The process involves metering the monomer mix simultaneously with an initiator into an aqueous liquor containing from 0.5 to 10% by weight of an anionic emulsifier, polymerizing the monomers to form the dispersion, and adjusting the dispersion to a pH of 7 to 10. The quantitative ratio of monomers to water is chosen in such a manner that the resulting dispersion contains from 20 to only 45% of solids.

Dispersions of polymers formed from a monomer mix comprising 8 to 20% by weight of an olefinically unsaturated $C_3$–$C_5$ mono- or $C_4$–$C_8$-dicarboxylic acid or anhydride are disclosed in U.S. Pat. No. 5,356,968. The dispersions, which may comprise 10 to 60% by weight solids, are obtained by emulsion polymerization of the monomers in the presence of an emulsifier mixture comprising at least two anionic emulsifiers and optionally one or more nonionic emulsifiers. The mixture is present in an amount of from 0.5 to 7% by weight based on the weight of monomers. The average particle size of the polymer in the dispersion is from 60 to 100 nm. Though it is disclosed that to produce only a small increase in viscosity at about pH 7–10, relatively large amounts of free radical initiator are required, the increase in viscosity as pH increases to 7–10 is still quite significant.

U.S. Pat. No. 5,141,814 discloses non-ionically stabilized core-sheath addition polymer particles of 100 nm maximum average diameter, the core comprising addition polymer and being water insoluble and the sheath comprising polyoxyalkylene chains of average chain length of from 6 to 25 oxyalkylene units per chain. At least 20 percent of the chains are covalently bonded to the core and there being present on the core sufficient chains such that the mass ratio of core to sheath is from 98:2 to 60:40. Though these sterically stabilized dispersions are described to be relatively insensitive to pH changes and the dispersions are exemplified to have high solids content, only small proportions, e.g. up to 5% by weight of the core polymer, of ionic monomers such as acrylic acid and methacrylic acid can be tolerated. Further, environmental pressures are being placed on manufacturers to reduce or eliminate the use of polyoxyalkylenes.

In DE-A-4026640, it is disclosed that oligomeric carboxylic acids can be used as stabilizers for the emulsion polymerization of olefinically unsaturated monomers and that this leads to fine particulate polymer dispersions that are coagulate-free and extremely shear stable. The dispersions may contain 20 to 65% by weight dispersed polymer with a mean particle diameter of less than 100 nm. In the worked examples, the stabilizer is present in an amount of from 16–46% by weight of polymer. There is no disclosure or suggestion that the oligomeric carboxylic acids would be useful for stabilizing carboxylic-containing polymer dispersions.

Aqueous coating and lacquer compositions comprising a graft copolymer having carboxylic-acid functional macromonomers attached at a terminal end thereof to a polymeric backbone are described in WO-A-9532228 and WO-A-95322255, respectively. Though the references generally refer to the macromonomer being polymerized from carboxylic functional monomers, such as acrylic acid, methacrylic acid, maleic acid, itaconic acid and their anhydrides, methacrylic acid based macromonomers are clearly preferred and only these methacrylic acid based macromonomers are exemplified. High solids dispersions of copolymers formed from methacrylic acid based macromonomers can be prepared with small particle sizes. However, the worked examples (see, for example, worked Example 8), indicate that copolymers formed from methacrylic acid based macromonomers are not capable of demonstrating low viscosities at high pH, such as at pH 9.

It is an object of the present invention to provide a dispersion of carboxylic-acid containing polymer which is capable of demonstrating low viscosities over a broad pH range. It is a further object of this invention that the dispersion can be manufactured by conventional emulsion polymerization techniques and does not essentially require the use of significant quantities of anionic surfactant.

In accordance with the present invention, there is provided an aqueous dispersion of a copolymer formed by the emulsion polymerization of a monomer mixture comprising:

a) from 0.1 to 20% by weight of one or more terminally unsaturated oligomers of the formula:

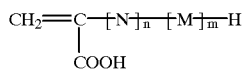

wherein N is a residue of the formula:

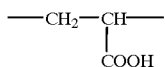

wherein M is the residue of an ethylenically unsaturated monomer;

wherein said N and M residues are randomly arranged in said oligomer;

wherein m is the total number of M residues in said oligomer and is in the range 0 to 47;

wherein n is the total number of N residues in said oligomer and is in the range 2 to 140; and wherein the sum of n and m is in the range from 3 to 150; and b) from 80 to 99.9% by weight of at least two monomers selected from the group consisting of esters of acrylic and methacrylic acid with alcohol containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitrites containing from 3 to 6 carbons, vinyl halides, and non-aromatic hydrocarbons containing from 2 to 8 carbons and at least one olefinic double bond.

The term "said N and M residues are arranged randomly in said oligomer" means that the residue adjacent the terminally unsaturated moiety may be either an N or an M residue, that the residue adjacent the residue adjacent the terminally unsaturated moiety may be either an N or an M residue, and so on.

Surprisingly, though the aqueous dispersions of the present invention may comprise a relatively high acid content, they are capable of demonstrating low viscosities over a broad pH range. That a dispersion is able to demonstrate low viscosities over a broad pH range enables the polymer manufacturer to prepare the dispersion with a high solids content and a high pH. Further, it enables the polymer manufacturer to prepare the dispersion with a very fine particle size.

In accordance with another aspect of the present invention, there is provided a method for the preparation of an emulsion polymer having an average particle diameter no greater than 250 nm, which method comprises subjecting a monomer mixture comprising:

a) from 0.1 to 20% by weight of one or more terminally unsaturated oligomers of the formula:

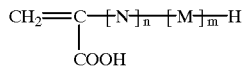

wherein N is a residue of the formula:

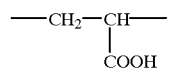

wherein M is the residue of an ethylenically unsaturated monomer;

wherein said N and M residues are randomly arranged in said oligomer;

wherein m is the total number of M residues in said oligomer and is in the range 0 to 47;

wherein n is the total number of N residues in said oligomer and is in the range 2 to 140; and wherein the sum of n and m is in the range 3 to 150; and b) from 80 to 99.9% by weight of at least two monomers selected from the group consisting of esters of acrylic and methacrylic acid with alcohol containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitrites containing from 3 to 6 carbons, vinyl halides, and non-aromatic hydrocarbons containing from 2 to 8 carbons and at least one olefinic double bond;

to a free radical polymerization in the presence of 0.5 to 10% by weight of an anionic emulsifier. Preferably the method comprises the further step of adjusting said dispersion to a pH of 7 to 10.

The monomer mixture which is polymerized to form the polymer dispersion of the present invention preferably comprises 1 to 10%, more preferably 2 to 8% by weight said terminally unsaturated oligomers a).

Suitable terminally unsaturated oligomers a) are known in the art. Preferably, said terminally unsaturated oligomers are as defined above but wherein m is in the range 0 to 20 and wherein n is in the range 3 to 20. More preferably, m is 0 and n is in the range 3 to 10. Processes suitable for the manufacture of oligomers a) are described in U.S. Pat. Nos. 4,056,559, 5,710,227, 5,587,431, 4,680,352, 4,694,054, and EP-0779305

M is preferably a residue of the formula

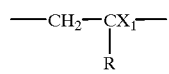

where $X_1$ is —H or —$CH_3$,

R is a phenyl radical, a vinyl radical, —$CONH_2$, —CN or —$COOX_2$, $X_2$ is ($C_1$ to $C_8$) alkyl radical, a vinyl radical, or an allyl radical. More preferably, M is a residue of one or more ethylenically unsaturated monomers selected from the group consisting of methylacrylate, ethyl acrylate, butyl acrylate, ethylhexyl acrylate, styrene, isoprene, butadiene, vinyl acetate, acrylamide, acrylonitrile, allylmethacrylate, methyl methacrylate, ethyl methacrylate and butyl methacrylate.

Suitable monomers b) are ($C_1$ to $C_{24}$) alkyl (meth)acrylates, preferably ($C_1$–$C_8$) alkyl (meth)acrylates, most preferably methyl methacrylate, ethyl methacrylate, ethyl acrylate, butyl acrylate, butyl methacrylate and 2-ethylhexyl acrylate, and glycidyl (meth)acrylates, preferably glycidyl methacrylate. The amides of acrylic and methacrylic acid is preferably acrylamide. The vinyl esters of carboxylic acids with from 1 to 20 carbons are preferably vinyl laurate, vinyl stearate, vinyl propionate and vinyl acetate, most preferably vinyl acetate. The vinyl aromatic compounds containing up to 20 carbons are preferably vinyltoluene, styrene, methylstyrene, butylstyrene and decylstyrene, most preferably styrene. The ethylenically unsaturated nitriles containing from 3 to 6 carbons are preferably acrylonitrile and methacrylonitrile. The vinyl halides are preferably vinyl chloride and vinylidene chloride. The non-aromatic hydrocarbons with 2 to 8 carbons and at least one olefinic double bond are preferably butadiene, isoprene and chloroprene.

Monomers b) are preferably selected from the group consisting of methyl(meth)acrylate, ethyl(meth)acrylate, butyl(meth)acrylate, 2-ethylhexyl(meth)acrylate, decyl(meth)acrylate, lauryl(meth)acrylate, isobornyl(meth)acrylate, isodecyl(meth)acrylate, oleyl(meth)acrylate, palmityl(meth)acrylate, steryl(meth)acrylate, styrene, butadiene, vinyl acetate, vinyl chloride, vinylidene chloride, acrylonitrile, methacrylonitrile, acrylamide and glycidylmethacrylate.

The monomer mixture which is polymerized to form the polymer dispersion of the present invention may optionally comprise up to 10% by weight of other copolymerizable monomers. Suitable other copolymerizable monomers are preferably selected from the group consisting of hydroxyethyl(meth)acrylate, hydroxypropyl(meth)acrylate, acrylic acid, methacrylic acid, crotonic acid, fumaric acid, maleic acid, mono-methyl itaconate, mono-methyl fumarate, monobutyl fumarate, maleic anhydride, substituted acrylamides, diacetone acrylamide, acetoacetoxy ethyl methacrylate, acrolein, methacrolein, dicyclopentadienyl methacrylate, dimethyl meta-isopropenyl benzyl isocyanate, isocyanato ethyl methacrylate, methyl cellulose, hydroxyethyl cellulose, ethylene, propylene, N-vinyl pyrrolidone, and N,N'-dimethylamino(meth)acrylate.

The polymer particles of the dispersion of the present invention preferably have an average diameter no greater than 250 nm, more preferably no greater than 100 nm, and most preferably in the range 40 to 100 nm.

The polymer dispersion of the present invention may be formed by any emulsion polymerization technique suitable for emulsion polymerization of monomer mixtures comprising up to 20% by weight mono- or di-carboxylic acid monomer. Such techniques are well known in the art. For example, the emulsion polymerization process described in U.S. Pat. No. 5,356,968 is very suitable for the preparation of the polymer dispersions of the present invention.

The emulsion polymerization must be performed in the presence of an anionic emulsifier. Such emulsifiers are well know in the art and include particularly, though not exclusively, alkali metal salts of sulphuric acid, semi esters of alkyl-phenols or alcohol, which may be ethoxylated, sulfates of ethoxylated alcohol, phosphoric acid esters, alkyl and aryl sulfosuccinates, and alkyl or aryl sulphonates.

The molecular weights of the emulsion polymers of the present invention are preferably no greater than 2 million, more preferably no greater than 1 million, as measured by gel permeation chromatography. Though the process of the present invention may be used to prepare emulsion polymers having molecular weights above 1 million, it is particularly suitable for the preparation of emulsion polymers having molecular weights 1 million or less.

Aqueous dispersions according to the present invention can be used in the preparation of aqueous dispersions having a multimodal, e.g. bimodal, particle size distribution.

Accordingly, in a further aspect of the present invention, there is provided an aqueous dispersion of polymer particles having a multimodal particle size distribution and comprising at least one copolymer formed by the emulsion polymerization of a monomer mixture comprising:

a) from 0.1 to 20% by weight of one or more terminally unsaturated oligomers of the formula:

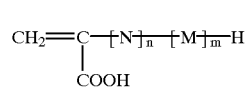

(I)

wherein N is a residue of the formula

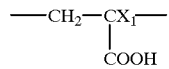

wherein $X_1$ is selected from the group consisting of H and $CH_3$;

wherein M is the residue of an ethylenically unsaturated monomer;

wherein said N and M residues are randomly arranged in said oligomer;

wherein m is the total number of M residues in said oligomer and is in the range 0 to 47;

wherein n is the total number of N residues in said oligomer and is in the range 2 to 140; and wherein the sum of n and m is in the range from 3 to 150;

b) from 80 to 99.9% by weight of at least two monomers selected from the group consisting of esters of acrylic and methacrylic acid with alcohol containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitrides containing from 3 to 6 carbons, vinyl halides, and non-aromatic hydrocarbons containing from 2 to 8 carbons and at least one olefin double bond; and c) from 0 to 10% by weight of other copolymerizable monomers. Preferably at least one mode of the multimodal particle size distribution has an average particle diameter of from 40 to 100 nm. More preferably, a major portion of at least one mode, having an average particle diameter of from 40 to 100 nm, comprises said at least one copolymer.

The preparation and use of bimodal emulsion polymers is well known in the art, for example as disclosed in U.S. Pat. Nos. 4,539,361 and 5,624,992. Particularly, the present invention may be useful for making stable emulsion polymers containing particles with a four to ten fold difference in particles size at high solids without limitations of the pH or viscosity.

The polymer dispersions of the present invention may be used in or as compositions for various applications including, without limitation, coatings, such as paints, primers and varnishes, binders for nonwovens and textiles, dispersants such as pigment dispersants, paper coatings, leather treatments, adhesive, floor polishes, caulks, and elastomeric wall mastics. The dispersions may be used alone or in combination with one or more other polymer dispersions.

The invention will now be more specifically described in terms of the following examples of some preferred embodiments which are given for the purposes of illustration only, and may be contrasted with the comparative tests also given below.

EXAMPLES

Preparation of Terminally Unsaturated Oligomers

Oligomers A, B, and C were prepared substantially according to the procedures described in U.S. Pat. No. 5,710,227. The oligomers are unneutralized. Oligomer A was prepared at 29% solids in water, with Mw=1199 and Mn=485. Oligomer B was prepared at 30% solids in water, then water was reduced in vacuo yielding material at 66% solids, with Mw=336 and Mn=204. Oligomer C was prepared at 27% solids, with Mw=595 and Mn=390.

Comparative Example No. 1. (5% MAA)

An emulsion polymer was prepared in a conventional manner (substantially according to the procedure described in U.S. Pat. No. 5,356,968). A mixture of monomers was prepared by combining 210 g of deionized water, 7.7 g of ammonium salt of lauryl sulfate, 408 g of methyl methacrylate, 255 g of 2-ethyl-hexylacrylate, 18 g of styrene, and 36 g of methacrylic acid. The monomer mix was emulsified by mixing under standard conditions. 350 g of deionized water and 58 g of the ammonium salt of lauryl sulfate were charged to a three liter flask, and the contents heated to 83–85° C. 40 g of the emulsified monomer mixture was charged to flask, followed by 9.8 g of an 18% aqueous solution of ammonium persulfate. After a four degree exotherm, the emulsified monomer mixture and 58 g of a 0.6% aqueous solution of ammonium persulfate solution were added linearly and separately over 150 minutes while maintaining the temperature of the contents at 83–85° C. After the completed additions, the contents of the flask were cooled to 65° C. The remaining monomer was reduced by the sequential addition of aqueous ferrous sulfate, aqueous tertiary butyl hydroperoxide, and sodium sulfoxylate formaldehyde. The polymer neutralized to a pH of 7.4 with ammonia, and Kathon brand LX biocide was added. The product was diluted with deionized water to provide a polymer solids level of 42.4% by weight. The latex had an average particle diameter of 60 nm and a viscosity of 1000 cps (centipoise).

Comparative Examples Nos. 2 and 3

Comparative Examples Nos. 2 and 3 were prepared substantially in the same manner as Comparative Example No.1. Comparative Examples No. 2 and 3 differed in composition, acid level and solids:

Comparative No. 2. (8% MAA)

The ratio of the emulsified monomer mixture was 200 g of deionized water, 7.7 g of ammonium salt of lauryl sulfate, 394 g of methyl methacrylate, 248 g of 2-ethyl-hexylacrylate, 18 g of styrene, and 58 g of methacrylic acid, and 4 g of n-dodecyl mercaptan. The initial reactor charge was 691 of deionized water, 58 g of ammonium salt of lauryl sulfate. The final latex was 37.6% by weight solids, with an average particle diameter of 48 nm, pH=6.4, and a viscosity of 768 cps.

Comparative No. 3. (8% MAA)

The ratio of the emulsified monomer mixture was 200 g of deionized water, 7.7 g of ammonium salt of lauryl sulfate, 394 g of methyl methacrylate, 248 g of 2-ethyl-hexylacrylate, 18 g of styrene, and 58 g of methacrylic acid, and 4 g of n-dodecyl mercaptan. The initial reactor charge was 350 of deionized water, 58 g of ammonium salt of lauryl sulfate. The final latex was 43.9% by weight solids, with an average particle diameter of 61 nm, pH=6.7, and a viscosity of 1444 cps.

Example No. 4. (5% Oligomer A)

This emulsion polymer was prepared substantially as described in Comparative Example 1, in a conventional manner. A mixture of monomers was prepared by combining 223 g of deionized water, 9.5 g of ammonium salt of lauryl sulfate, 509 g of methyl methacrylate, 304 g of 2-ethyl-hexylacrylate, 22 g of styrene, and 152 g of a 29% aqueous solution of Oligomer A. The monomer mix was emulsified by mixing under standard conditions. 510 g of deionized water and 71 g of the ammonium salt of lauryl sulfate were charged to a three liter flask, and the contents heated to 83–85° C. 40 g of the emulsified monomer mixture was charged to flask, followed by 12.2 g of an 18% aqueous solution of ammonium persulfate. After a four degree exotherm, the emulsified monomer mixture and 45 g of a 1.0% aqueous solution of ammonium persulfate solution were added linearly and separately over 150 minutes while maintaining the temperature of the contents at 83–85° C. After the completed additions, the contents of the flask were cooled to 65° C. The remaining monomer was reduced by the sequential addition of aqueous ferrous sulfate, aqueous tertiary butyl hydroperoxide, and sodium sulfoxylate formaldehyde. The polymer neutralized to a pH of 4.2 with ammonia, and Kathon brand LX biocide was added. The product was diluted with deionized water to provide a polymer solids level of 44.0% by weight. The polymer dispersion had an average particle diameter of 62 nm and a viscosity of 41 cps.

Examples Nos. 5 Through 8.

Examples Nos. 5 through 8 were prepared in substantially the same manner as Example No. 4, but differed in composition, Oligomer level, and solids.

Example No. 5. (5% Oligomer A, Higher Solids)

The ratio of monomers employed were 421 g of methyl methacrylate, 392 g of 2-ethyl-hexylacrylate, 22 g of styrene, and 152 g of a 29% aqueous solution of Oligomer A. The emulsified monomer mixture and 45 g of a 1.0% aqueous solution of ammonium persulfate solution were added linearly and separately to 360 g of deionized water, 71 g of the ammonium salt of lauryl sulfate. The final latex was 48.9% by weight polymer solids, with an average particle diameter of 83 nm, pH=3.7, and a viscosity of 308 cps.

Example No. 6. (5% Oligomer B)

The ratio of monomers employed was 509 g of methyl methacrylate, 304 g of 2-ethyl-hexylacrylate, 22 g of styrene, and 66 g of a 66% aqueous solution of Oligomer B. The monomer mixture and 45 g of a 1.0% aqueous solution of ammonium persulfate solution were added linearly and separately to 510 g of deionized water, 71 g of the ammonium salt of lauryl sulfate. The final latex was 43.5% by weight polymer solids, with an average particle diameter of 62 nm, pH=3.8, and a viscosity of 29 cps.

Example No. 7: (2% Oligomer A)

The ratio of monomers employed was 430 g of methyl methacrylate, 409 g of 2-ethyl-hexylacrylate, 22 g of styrene, and 61 g of a 29% aqueous solution of Oligomer A. The monomer mixture and 45 g of a 1.0% aqueous solution of ammonium persulfate solution were added linearly and separately to 525 g of deionized water, 56 g of the ammonium salt of lauryl sulfate. The final latex was 44.7% by weight polymer solids, with an average particle diameter of 86 nm, pH=5.8, and a viscosity of 55 cps.

Example No. 8: (8% Oligomer A)

The ratio of monomers employed was 408 g of methyl methacrylate, 379 g of 2-ethyl-hexylacrylate, 22 g of styrene, and 243 g of a 29% aqueous solution of Oligomer A. The monomer mixture and 45 g of a 1.0% aqueous solution of ammonium persulfate solution were added linearly and separately to 510 g of deionized water, 56 g of the ammonium salt of lauryl sulfate. The final latex was 44.8% by weight polymer solids, with an average particle size of 93 nm, pH=4.5, and a viscosity of 26 cps.

Comparative Example No. 9. (5% MAA)

This emulsion polymer was prepared in a conventional manner (substantially as described in U.S. Pat. No. 5,356, 968). A mixture of monomers was prepared by combining 255 g of deionized water, 7.4 g of sodium salt of lauryl sulfate, 441 g of methyl methacrylate, 374 g of butyl acrylate, and 43.4 g of methacrylic acid. The monomer mix was emulsified by mixing under standard conditions. 600 g of deionized water and 113.5 g of the sodium salt of lauryl sulfate were charged to a three liter flask, and the contents heated to 83–85° C. 91 g of a 4.7% aqueous solution of ammonium persulfate was added to the reactor. The emulsified monomer mixture was added linearly over 120 minutes while maintaining the temperature of the contents at 83–85° C. After the completed additions, the contents of the flask were cooled to 65° C. The remaining monomer was reduced by the sequential addition of aqueous ferrous sulfate, aqueous tertiary butyl hydroperoxide and sodium sulfoxylate formaldehyde. The polymer neutralized to a pH of 6.2 with ammonia, and Kathon brand LX biocide was added. The product was diluted with deionized water to provide a polymer solids level of 44.6% by weight. The emulsion had an average particle diameter of 57 nm and a viscosity of 67 cps.

Comparative Examples No. 10

Comparative Examples No. 10 was prepared in substantially the same manner as Comparative Example No.9. Comparative Example No. 10 differed in acid level, soap, and solids:

Comparative No. 10. (2% MAA)

A mixture of monomers was prepared by combining 405 g of deionized water, 2.8 g dodecylbenzene sulfate, 5.5 g sodium salt of polyethoxy-nonylphenol, 472 g of methyl methacrylate, 401 g of butyl acrylate, and 18.4 g of methacrylic acid. 462 g of deionized water, 37.2 g dodecylbenzene sulfate, and 111 g sodium salt of polyethoxy-nonylphenol 113.5 g of the sodium salt of lauryl sulfate were charged to a three liter flask, and the contents heated to 83–85° C. 13 g of a 22% aqueous solution of ammonium persulfate was added to the reactor. The emulsified monomer mixture and 45 g of a 1.6% aqueous solution of ammonium persulfate were added linearly and separately over 120 minutes while maintaining the temperature of the contents at 83–85° C. The product was diluted with deionized water to provide a polymer solids level of 45.9% by weight. The latex had an average particle diameter of 76 nm at pH 6.3, and a viscosity of 90 cps.

Example No. 11. (2% Oligomer A)

This emulsion polymer was prepared in substantially the same manner as described above for Comparative Example 10. A mixture of monomers was prepared by combining 240 g of deionized water, 6.1 g of sodium salt of lauryl sulfate, 461 g of methyl methacrylate, 393 g of butyl acrylate, and 60.6 g of a 29% solution of Oligomer A. The monomer mix was emulsified by mixing under standard conditions. 600 g of deionized water, 93.4 g of the sodium salt of lauryl sulfate were charged to a three liter flask, and the contents heated to 83–85° C. 92 g of a 4.7% aqueous solution of ammonium persulfate was added to the reactor. The emulsified monomer mixture was linearly over 120 minutes while maintaining the temperature of the contents at 83–85° C. After the completed additions, the contents of the flask were cooled to 65° C. The remaining monomer was reduced by the sequential addition of aqueous ferrous sulfate, aqueous tertiary butyl hydroperoxide and sodium sulfoxylate formaldehyde. The polymer neutralized to a pH of 4.0 with ammonia, and Kathon brand LX biocide was added. The product was diluted with deionized water to provide a polymer solids level of 44.6% by weight. The latex had an average particle diameter of 68 nm and a viscosity of 227 cps.

Examples Nos. 12 Through 16

Examples Nos. 12 through 16 were prepared in a substantially similar manner as Example No. 11. Examples No. 12 through 16 differed in Oligomer, Oligomer level, composition, and solids:

Example No. 12: (2% Oligomer B)

The ratio of monomers employed was 445 g of methyl methacrylate, 378 g of butyl acrylate, and 25.4 g of a 66% aqueous solution of Oligomer B. 665 g of deionized water and 111 g of the sodium salt of lauryl sulfate were charged to a three liter flask, and the contents heated to 83–85° C. 89 g of a 4.7% aqueous solution of ammonium persulfate was added to the reactor. The emulsified monomer mixture was linearly over 120 minutes while maintaining the temperature of the contents at 83–85° C. The final latex was 44.2% by weight polymer solids, with an average particle diameter of 51 nm, pH=4.1, and a viscosity of 182 cps.

Example No. 13: (5% Oligomer B)

The ratio of monomers employed was 303 g of methyl methacrylate, 257 g of butyl acrylate, and 44.6 g of a 66% aqueous solution of Oligomer B. 460 g of deionized water and 78 g of the sodium salt of lauryl sulfate were charged to a three liter flask, and the contents heated to 83–85° C. 63 g of a 4.7% aqueous solution of ammonium persulfate was added to the reactor. The emulsified monomer mixture was linearly over 120 minutes while maintaining the temperature of the contents at 83–85° C. The final latex was 44.2% by weight polymer solids, with an average particle diameter of 53 nm, pH=2.8, and a viscosity of 50 cps.

Example No. 14: (5% Oligomer C)

The ratio of monomers employed was 303 g of methyl methacrylate, 257 g of butyl acrylate, and 111 g of a 27% aqueous solution of Oligomer C. 425 g of deionized water and 78 g of the sodium salt of lauryl sulfate were charged to a three liter flask, and the contents heated to 83–85° C. 63 g of a 4.7% aqueous solution of ammonium persulfate was added to the reactor. The emulsified monomer mixture was linearly over 120 minutes while maintaining the temperature of the contents at 83–85° C. The final latex was 43.7% by weight polymer solids, with an average particle diameter of 54 nm, pH=2.6, and a viscosity of 324 cps.

Example No. 15: (5% Oligomer A)

The ratio of monomers employed was 303 g of methyl methacrylate, 257 g of butyl acrylate, and 104 g of a 28% aqueous solution of Oligomer A. 585 g of deionized water and 63 g of the sodium salt of lauryl sulfate were charged to a three liter flask, and the contents heated to 83–85° C. 63 g of a 4.7% aqueous solution of ammonium persulfate was added to the reactor. The emulsified monomer mixture was linearly over 120 minutes while maintaining the temperature of the contents at 83–85° C. The final latex was 39.3% by weight polymer solids, with an average particle diameter of 45 nm, pH=2.4, and a viscosity of 114 cps.

Example No. 16: (5% Oligomer A, Higher Solids)

The ratio of monomers employed was 303 g of methyl methacrylate, 257 g of butyl acrylate, and 104 g of a 28% aqueous solution of Oligomer A. 280 g of deionized water and 63 g of the sodium salt of lauryl sulfate were charged to a three liter flask, and the contents heated to 83–85° C. 63 g of a 4.7% aqueous solution of ammonium persulfate was added to the reactor. The emulsified monomer mixture was linearly over 120 minutes while maintaining the temperature of the contents at 83–85° C. The final latex was 49.7% by weight polymer solids, with an average particle diameter of 77 nm, pH=2.1, and a viscosity of 3920 cps
Blend of Ultrafine latex and Large Particle Size Latex Example No. 17: (Large Mode for Blending Study)

This emulsion polymer was prepared substantially in the manner described in U.S. Pat. No. 5,356,968. A mixture of monomers was prepared by combining 338 g of deionized water, 27 g of dodecylbenzene sulfonate, 2082 g of butyl acrylate, 161 g of acrylonitrile, 58 g of acrylic acid. The monomer mix was emulsified by mixing under standard conditions. 854 g of deionized water was charged to a three liter flask, and the contents heated to 84–86° C. 41 g of an emulsion polymer was charged to flask, followed by 20.4 g of an 27% aqueous solution of sodium persulfate. The emulsified monomer mixture and 98 g of a 4.1% aqueous solution of sodium persulfate solution were added linearly and separately over 180 minutes while maintaining the temperature of the contents at 84–86° C. After the completed additions, the contents of the flask were cooled to 65° C. The remaining monomer was reduced by the sequential addition of aqueous ferrous sulfate, ethylenediaminetetraacetic acid, aqueous tertiary butyl hydroperoxide, and isoascorbic acid. The polymer neutralized to a pH of 5.7 with sodium hydroxide. The product was diluted with deionized water to provide a polymer solids level of 58.1% by weight. The emulsion had an average particle diameter of 400 nm and a viscosity of 349 cps.

Example No. 18: (90/10 Blend of Large Mode/ Ultrafine Mode)

11 g of Example No. 14 was neutralized to pH 5.2 with ammonia. The viscosity of this ultrafine emulsion was 18 cps. This latex was added with stirring to 99 g of Example 17. The blend was 56.7% solid polymer, pH=5.55, and viscosity was 57 cps. The blend was left standing at room temperature for 24 hours. After 24 hours, there was no sign of sedimentation, the pH was 5.54, and the viscosity was 54 cps. Example No. 19: (75/25 blend of Large mode/ Ultrafine mode) 27.5 g of Example No. 14 was neutralized to pH 5.2 with ammonia. The viscosity of this ultrafine latex was 18 cps. This latex was added with stirring to 82.5 g of Example 17. The blend was 54.5% solid polymer, pH=5.57, and viscosity was 38 cps. The blend was left standing at room temperature for 24 hours. After 24 hours, there was no sign of sedimentation, the pH was 5.55, and the viscosity was 36 cps.

Stability Tests

Each of the above latices was tested for its stability, firstly over a range of pHs and secondly over a period of time at 60° C. at pH 8.

1. The pH—viscosity profiles were determined by measuring the viscosity of 150 g of each emulsion polymer at pH 3, 7, and 9 on a Brookfield viscometer, model DV-I, at 25° C. using an appropriate spindle and speed. The initial pH of each emulsion polymer was adjusted to 3.0 with 5% hydrochloric acid or 28% ammonium hydroxide, and the viscosity measured. Each sample was then adjusted to pH 7 and pH 9 with 28% ammonium hydroxide and the viscosity measured.

2. The heat age viscosities at high pH were determined by adjusting the pH of 150 g samples of the emulsion polymer to as close to pH 9 without coagulating the sample. The viscosity was measured on a Brookfield viscomer, model DV-I, at 25° C. using an appropriate spindle and speed. The samples were stored in a 60° C. oven. The viscosities were remeasured after 1,2, and 4 weeks at 60° C.

The results of the tests are shown in Table A below:

TABLE A

| | pH Viscosity Profile (cps at 25° C.) | | | | Heat Age Viscosity Profile (cps at 60° C.) | | | |
| --- | --- | --- | --- | --- | --- | --- | --- | --- |
| Latex | Viscosity pH = 3 | Viscosity pH = 7 | Viscosity pH = 9 | pH | Viscosity Time 0 | Viscosity 1 week | Viscosity 2 weeks | Viscosity 4 weeks |
| 1 | NM | 1000 | 4220 | 8 | 4220 | Gelled | | |
| 2 | NM | 700 | 30000 | 8 | 30000 | | | |
| 3 | NM | 3648 | gelled | 8 | Gelled | | | |
| 4 | 40 | 35 | 29 | 9 | 29 | 165 | 258 | 172 |
| 5 | 243 | 390 | 346 | 9 | 346 | 457 | 623 | 747 |
| 6 | 25 | 43 | 38 | 9 | 38 | 23 | 28 | 29 |
| 6 | 41 | 50 | 71 | 9 | 71 | 80 | 93 | 154 |
| 8 | 36 | 40 | 58 | 9 | 58 | 69 | 65 | 78 |
| 9 | NM | 248 | >10000 | 8 | 1890 | Gelled | | |
| 10 | NM | 100 | 1508 | 8 | 1508 | 7640 | 8690 | 19000 |
| 11 | 4700 | 133 | 259 | 9 | 155 | 190 | 190 | 264 |
| 12 | 3120 | 37 | 30 | 9 | 35 | 30 | 66 | 69 |
| 13 | 52 | 80 | 31 | 9 | 31 | 33 | 43 | 65 |
| 14 | 82 | 30 | 33 | 9 | 33 | 32 | 31 | 35 |
| 15 | 52 | 90 | 74 | 9 | 74 | 39 | 44 | 50 |
| 16 | 3080 | 340 | 608 | 9 | 2320 | 2592 | 3284 | 3508 |

1. pH—Viscosity Profiles

There are four key observations:

First, the comparative examples show a very large pH dependence on viscosity. Compare Examples 1, 2, and 3, where the latices either gel or irreversibly thicken. As the acid level increases, the viscosity rise is greater. This shows the limit of using conventional acid to stabilize a latex. This invention is particularly demonstrated when one compares example number 3 (8% MAA stabilizer) with example number 8 (8% oligomeric stabilizer).

Second, the experimental examples of the invention have viscosities which are independent of pH. Compare examples number 4–8, and 13–15. The viscosities are low, but more significantly, the viscosities are substantially constant over the pH range. This effect is demonstrated at low and high levels of oligomeric stabilizer.

Third, though the viscosities of the dispersions of the invention are proportional to the solids, the impact of solids is minimized—see examples number 15 and 16. The same oligomer was charged at identical levels. The higher solids example has the higher viscosity. However, the difference in viscosity is small considering there is a 10% difference in solids.

Fourth, some of the experimental examples of the present invention have viscosities which actually decrease as with increasing pH—see examples number 11 and 12.

2. Heat Age Viscosity Data

The heat age stability test demonstrates viscosity stability at elevated temperature. This test is an accelerated indicator of shelf life. The comparative examples could not be tested at pH 9 due to their inherent room temperature instability at high pH. The comparative examples number 1, 2, 3, 9, and 10 could only be tested at pH 8. Even at pH 8, upon heat aging, the comparative samples irreversibly coagulated or thickened to unacceptable levels.

The experimental examples of the present invention were tested at pH 9. They were all very stable over the course of the experiment. The very low viscosities at high pH were maintained under the stressful conditions of the test. Though the high solids examples number 5 and 16 had viscosities which increased by a factor of two, the final viscosities are were still relatively low. After completion of the heat age tests, all the experimental examples of the present invention could be used for further testing.

We claim:

1. An aqueous dispersion of a copolymer formed by aqueous emulsion polymerization of a monomer mixture comprising:

a) from 0.1 to 20% by weight of one or more terminally unsaturated oligomers of the formula:

$$CH_2=C-(-N-)_n-(-M-)_m-H$$
$$|$$
$$COOH$$

wherein N is a residue of the formula:

$$-CH_2-CH-$$
$$|$$
$$COOH$$

wherein M is the residue of an ethylenically unsaturated monomer;

wherein said N and M residues are randomly arranged in said oligomer;

wherein m is the total number of M residues in said oligomer and is in the range 0 to 47;

wherein n is the total number of N residues in said oligomer and is in the range 2 to 140; and wherein the sum of n and m is in the range from 3 to 150;

b) from 80 to 99.9% by weight of at least two monomers selected from the group consisting of esters of acrylic and methacrylic acid with alcohol containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and c) from 0 to 10% by weight of other copolymerizable monomers;

wherein said aqueous emulsion polymerization is performed in the presence of an anionic emulsifier at a pH less than 4.

2. An aqueous dispersion as claimed in claim 1, wherein said dispersion has a polymer solids content in the range of 40 to 70% by weight.

3. An aqueous dispersion as claimed in claim 1, wherein the monomer mixture comprises up to 10% by weight of other copolymerizable monomers c) selected from the group consisting of hydroxyethyl(meth)acrylate, hydroxypropyl (meth)acrylate, acrylic acid, methacrylic acid, crotonic acid, fumaric acid, maleic acid, mono-methyl itaconate, monomethyl fumarate, monobutyl fumarate, maleic anhydride, substituted acrylamides, diacetone acrylamide, acetoacetoxy ethyl methacrylate, acrolein, methacrolein, dicyclopentadienyl methacrylate, dimethyl meta-isopropenyl benzyl isocyanate, isocyanato ethyl methacrylate, methyl cellulose, hydroxyethyl cellulose, ethylene, propylene, N-vinyl pyrrolidone, and N,N'-dimethylamino(meth)acrylate.

4. An aqueous dispersion as claimed in claim 1, wherein the polymer particles of the dispersion of the present invention have an average diameter no greater than 250 nm.

5. An aqueous dispersion as claimed in claim 4, wherein the polymer particles of the dispersion of the present invention have an average diameter in the range 40 to 100 nm.

6. A method for the preparation of an emulsion polymer having an average particle diameter no greater than 250 nm, which method comprises subjecting a monomer mixture comprising:

a) from 0.1 to 20% by weight of one or more terminally unsaturated oligomers of the formula:

$$CH_2=C-(-N-)_n-(-M-)_m-H$$
$$|$$
$$COOH$$

wherein N is a residue of the formula:

$$-CH_2-CH-$$
$$|$$
$$COOH$$

wherein M is the residue of an ethylenically unsaturated monomer;

wherein said N and M residues are randomly arranged in said oligomer;

wherein m is the total number of M residues in said oligomer and is in the range 0 to 47;

wherein n is the total number of N residues in said oligomer and is in the range 2 to 140; and wherein the sum of n and m is in the range from 3 to 150;
b) from 80 to 99.9% by weight of at least two monomers selected from the group consisting of esters of acrylic and methacrylic acid with alcohol containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and
c) from 0 to 10% by weight of other copolymerizable monomers; to an aqueous free radical polymerization in the presence of 0.2 to 10% by weight of an anionic emulsifier at a pH less than 4.

7. A method as claimed in claim 6, wherein the percent by weight of polymer solids in the product emulsion is 40–70%.

8. An aqueous dispersion of polymer particles having a multimodal particle size distribution and comprising at least one copolymer formed by aqueous emulsion polymerization of a monomer mixture comprising:

from 0.1 to 20% by weight of one or more terminally unsaturated oligomers of the formula:

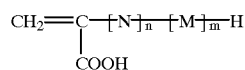

wherein N is a residue of the formula:

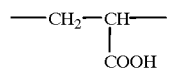

wherein M is the residue of an ethylenically unsaturated monomer;

wherein said N and M residues are randomly arranged in said oligomer;

wherein m is the total number of M residues in said oligomer and is in the range 0 to 47;

wherein n is the total number of N residues in said oligomer and is in the range 2 to 140; and wherein the sum of n and m is in the range from 3 to 150;

b) from 80 to 99.9% by weight of at least two monomers selected from the group consisting of esters of acrylic and methacrylic acid with alcohol containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and c) from 0 to 10% by weight of other copolymerizable monomers;

wherein said aqueous emulsion polymerization is performed in the presence of an anionic emulsifier at a pH less than or equal to 4.

9. An aqueous dispersion as claimed in claim 8, wherein at least one mode of the multimodal particle size distribution has an average particle diameter of from 40 to 100 nm.

10. An aqueous dispersion as claimed in claim 9, wherein a major portion of at least one mode, having an average particle diameter of from 40 to 100 nm, comprises said at least one copolymer.

11. The aqueous dispersion as claimed in claim 1 wherein said aqueous emulsion polymerization is performed by free radical polymerization in the presence of 0.2 to 10% by weight of said anionic emulsifier.

12. The aqueous dispersion as claimed in claim 8 wherein said aqueous emulsion polymerization is performed by free radical polymerization in the presence of 0.2 to 10% by weight of said anionic emulsifier.

* * * * *